United States Patent
Mohanty

(10) Patent No.: US 11,989,318 B2
(45) Date of Patent: May 21, 2024

(54) SYSTEM AND METHOD FOR DYNAMIC MASKING OF DATA IN A NETWORK

(71) Applicant: BANK OF AMERICA CORPORATION, Charlotte, NC (US)

(72) Inventor: Swetapadma Mohanty, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 262 days.

(21) Appl. No.: 17/568,045

(22) Filed: Jan. 4, 2022

(65) Prior Publication Data

US 2023/0214517 A1    Jul. 6, 2023

(51) Int. Cl.
*G06F 21/62*  (2013.01)
*G06N 10/40*  (2022.01)

(52) U.S. Cl.
CPC ...... *G06F 21/6227* (2013.01); *G06F 21/6245* (2013.01); *G06N 10/40* (2022.01); *G06F 2221/2125* (2013.01); *G06F 2221/2141* (2013.01)

(58) Field of Classification Search
CPC ............. G06F 21/6227; G06F 21/6245; G06F 2221/2125; G06F 2221/2141; G06N 10/40
See application file for complete search history.

(56) References Cited

U.S. PATENT DOCUMENTS

| | | | |
|---|---|---|---|
| 8,930,381 B2 | 1/2015 | Raghunathan et al. | |
| 9,171,182 B2 | 10/2015 | Shukla et al. | |
| 9,485,088 B2 | 11/2016 | Johnson | |
| 9,715,528 B2 | 7/2017 | Ho et al. | |
| 10,032,043 B2 | 7/2018 | Farkash et al. | |
| 10,341,098 B2 | 7/2019 | Bos et al. | |
| 10,462,148 B2 | 10/2019 | Saxena et al. | |
| 10,572,262 B2 | 2/2020 | Jaubert et al. | |
| 11,194,921 B2 | 12/2021 | Cachin et al. | |
| 11,196,750 B2 | 12/2021 | Gibbons | |
| 11,263,335 B2 | 3/2022 | Parthasarathy | |
| 11,481,508 B2 | 10/2022 | Butovsky et al. | |
| 2009/0049511 A1* | 2/2009 | Manickam | G06F 21/6254 726/1 |
| 2014/0019586 A1* | 1/2014 | Saxena | G11C 7/1009 709/217 |
| 2017/0085534 A1 | 3/2017 | Iyer et al. | |
| 2017/0104756 A1 | 4/2017 | Rosenthal et al. | |
| 2020/0057864 A1* | 2/2020 | Parthasarathy | G06F 16/24578 |
| 2020/0134201 A1* | 4/2020 | Bansal | H04L 9/3297 |
| 2021/0165633 A1* | 6/2021 | Guilley | G06F 7/508 |
| 2022/0019744 A1* | 1/2022 | Yu | G06V 20/30 |
| 2022/0123935 A1 | 4/2022 | Baessler et al. | |

(Continued)

Primary Examiner — Harris C Wang
(74) Attorney, Agent, or Firm — Moore & Van Allen PLLC; Nicholas C. Russell

(57) ABSTRACT

Embodiments of the present invention provide a system for dynamic masking of data in a network. The system is configured for receiving, via a graphical user interface, a data access request for accessing data from a user associated with an entity, determining that the data comprises sensitive information, determining that the user is not authorized to access the data, dynamically performing non-scramble masking of the data based on determining that the data comprises sensitive information and that the user is not authorized to access the data, and displaying masked data to the user, via the graphical user interface.

14 Claims, 6 Drawing Sheets

(56) References Cited

U.S. PATENT DOCUMENTS

| | | | |
|---|---|---|---|
| 2022/0138345 A1* | 5/2022 | Krishnan | G06N 20/00 726/26 |
| 2023/0214517 A1* | 7/2023 | Mohanty | G06N 10/40 726/26 |

* cited by examiner

SYSTEM AND METHOD FOR DYNAMIC MASKING OF DATA IN A NETWORK

BACKGROUND

Conventional systems do not have the capability to effectively mask data in a network. As such, there exists a need for a system that can dynamically mask the data in a network in real-time.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamic masking of data in a network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives, via a graphical user interface, a data access request for accessing data from a user associated with an entity, determines that the data comprises sensitive information, determine that the user is not authorized to access the data, dynamically performs non-scramble masking of the data based on determining that the data comprises sensitive information and that the user is not authorized to access the data, and displays masked data to the user, via the graphical user interface.

In some embodiments, the present invention performs non-scramble masking of the data based on generating a metadata file, masks each element of the data based on the metadata file, and concatenates masked elements to generate the masked data based on masking the each element of the data.

In some embodiments, the metadata file comprises at least a random number, an alpha array, a numeric array, and a special character array.

In some embodiments, the data comprises at least one of an alphabet element, an numerical element, and a special character element.

In some embodiments, the present invention performs alphabet masking of the alphabet element in the data based on the alpha array, performs numeric masking of the numerical element in the data based on the numeric array, and performs special character masking of the special character element in the data based on the special character array.

In some embodiments, the alphabet masking is performed based on a first conversion logic, the numeric masking is performed based on a second conversion logic, and the special character masking is performed based on a third conversion logic.

In some embodiments, the present invention generates the metadata file based on a randomized input generated by a quantum optimizer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
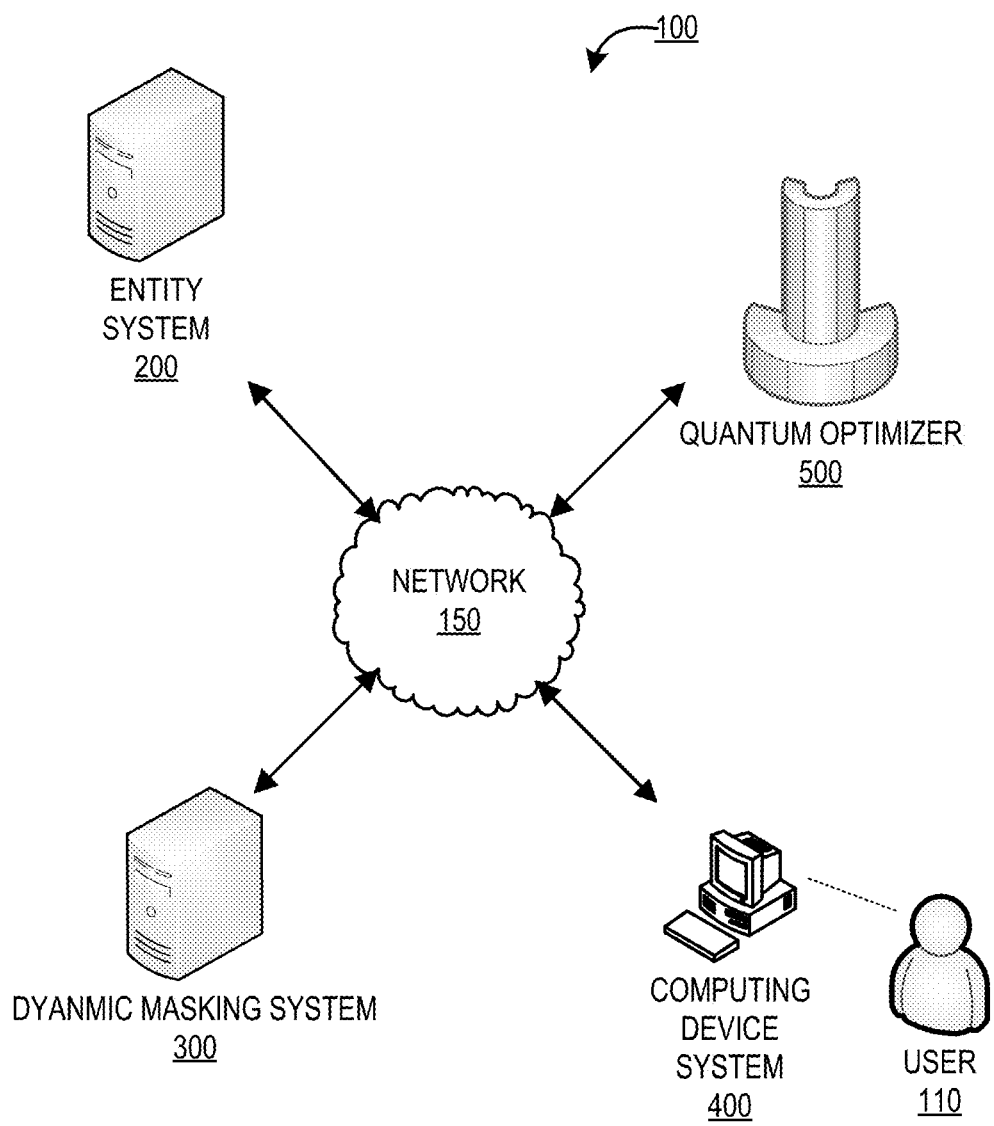
Figure 2:
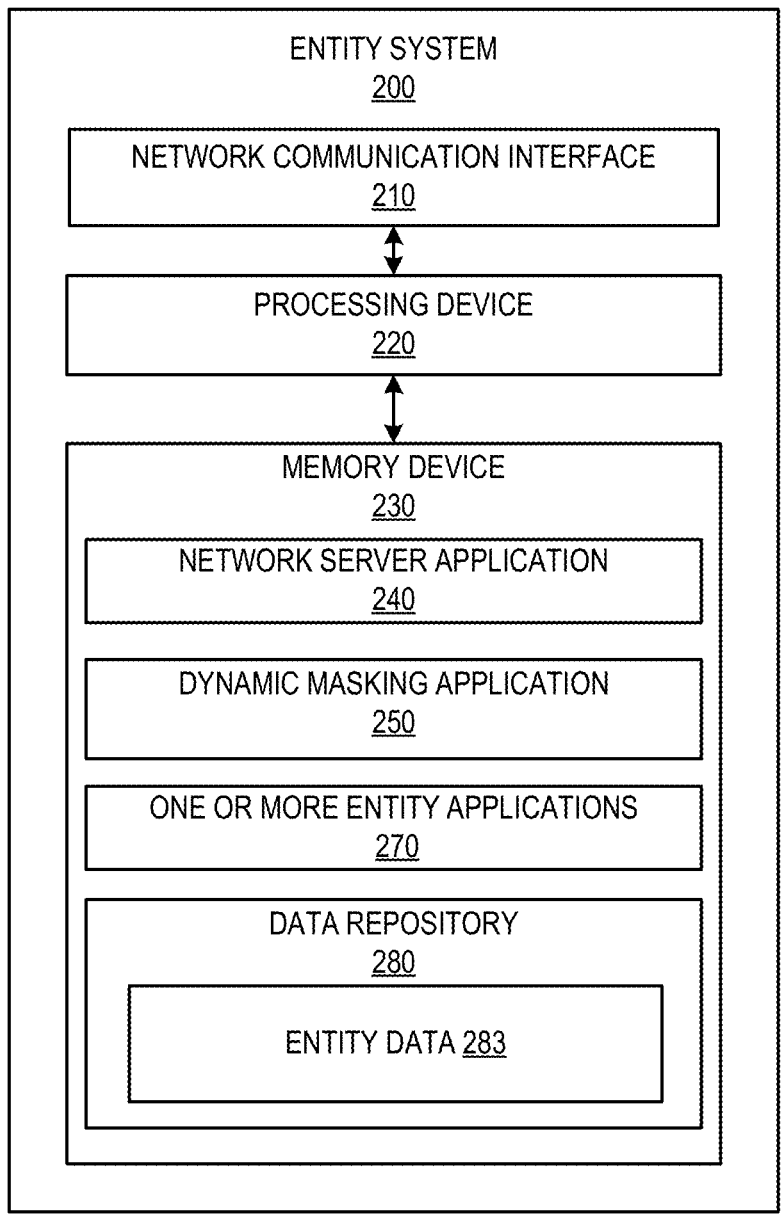
Figure 3:
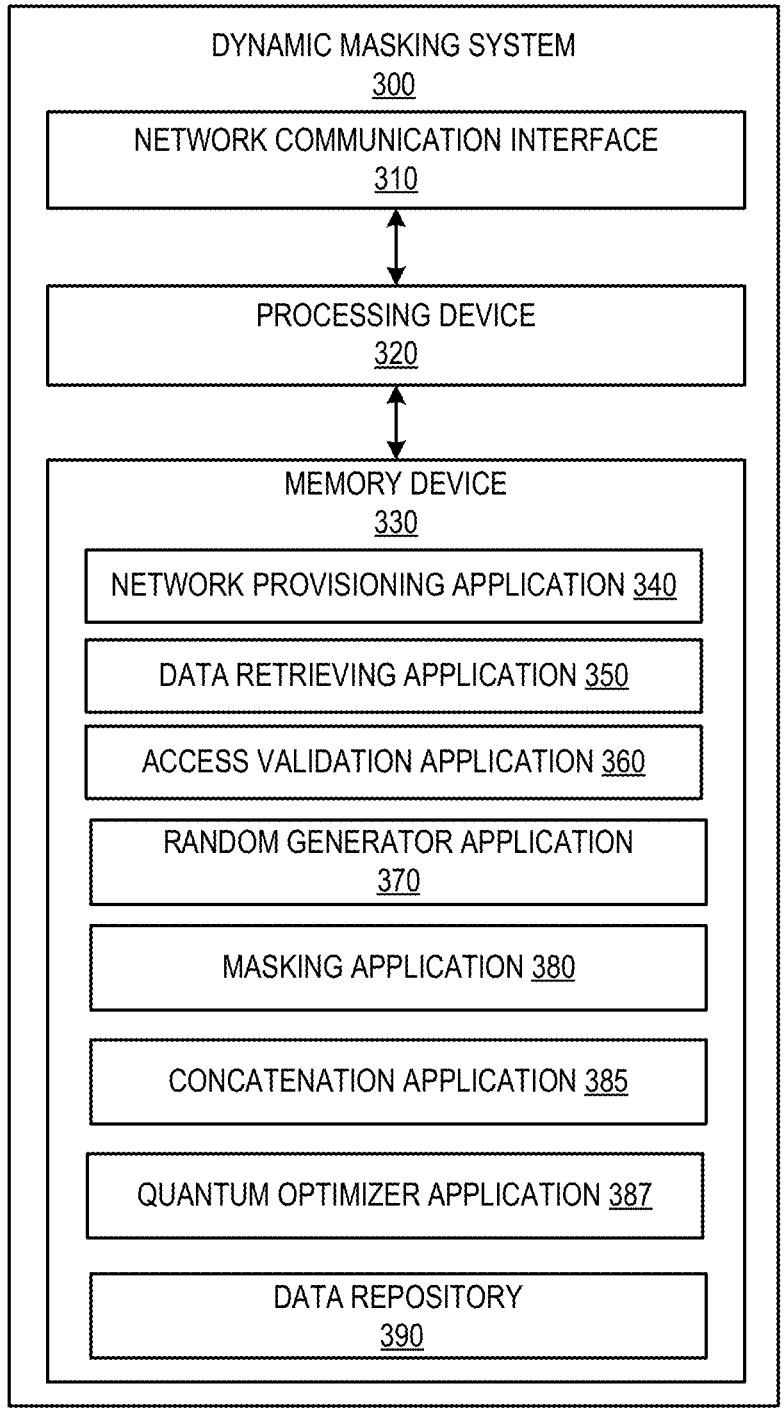
Figure 4:
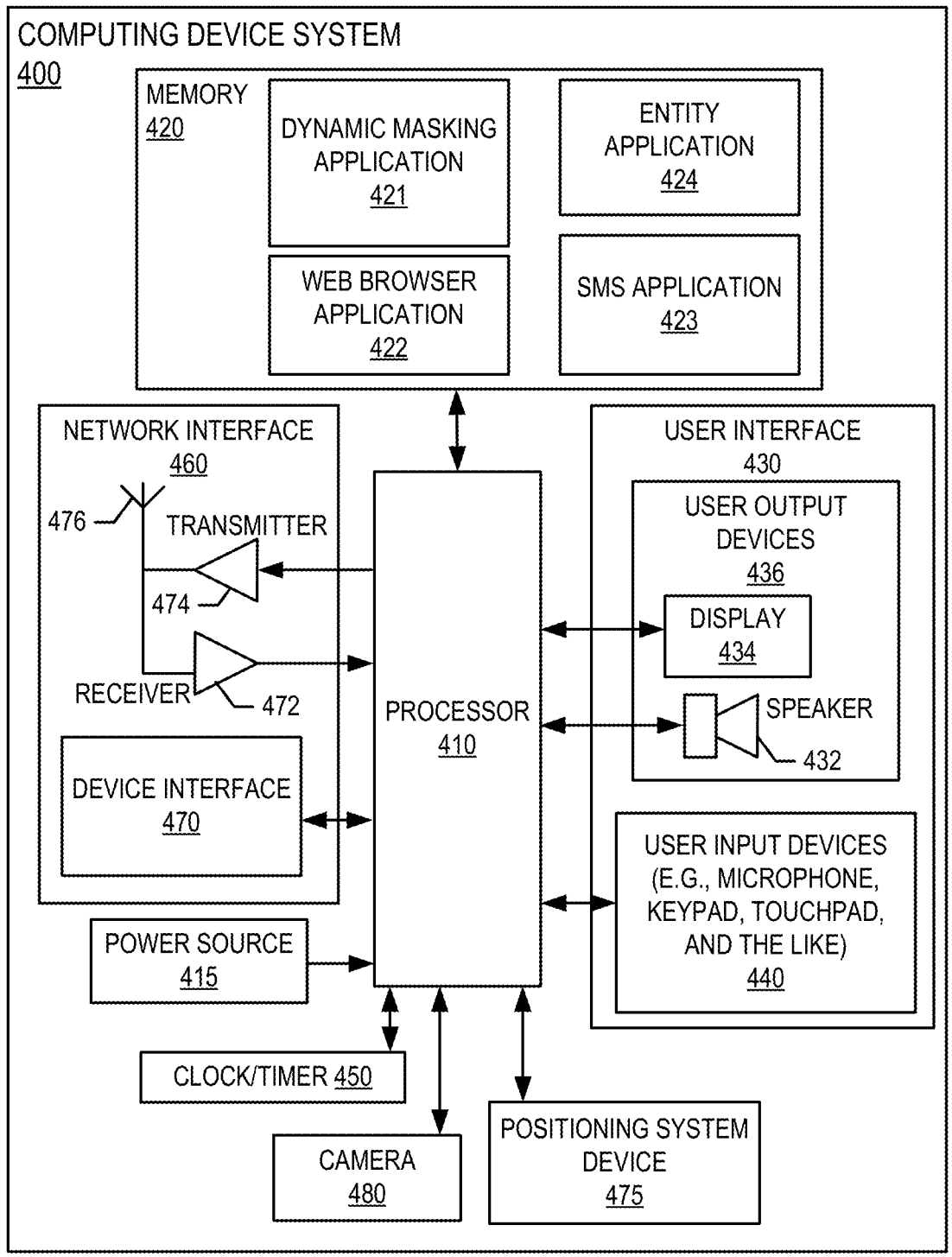
Figure 5:
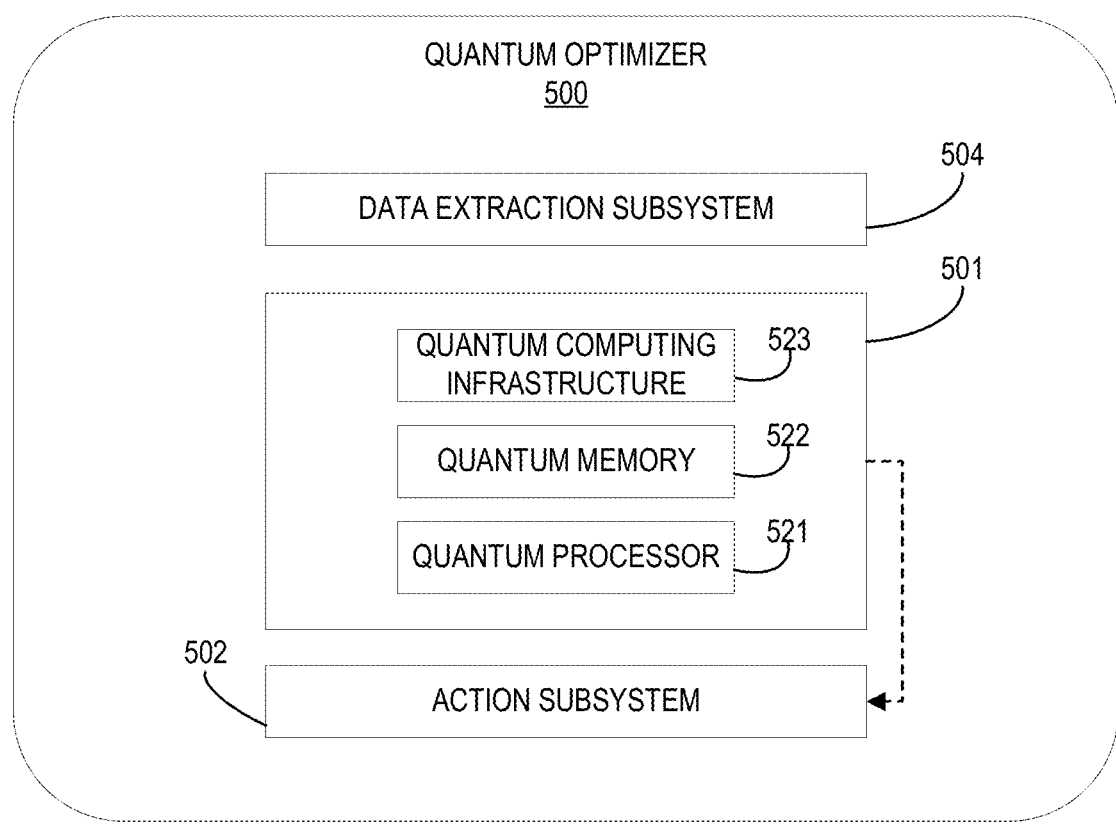
Figure 6:
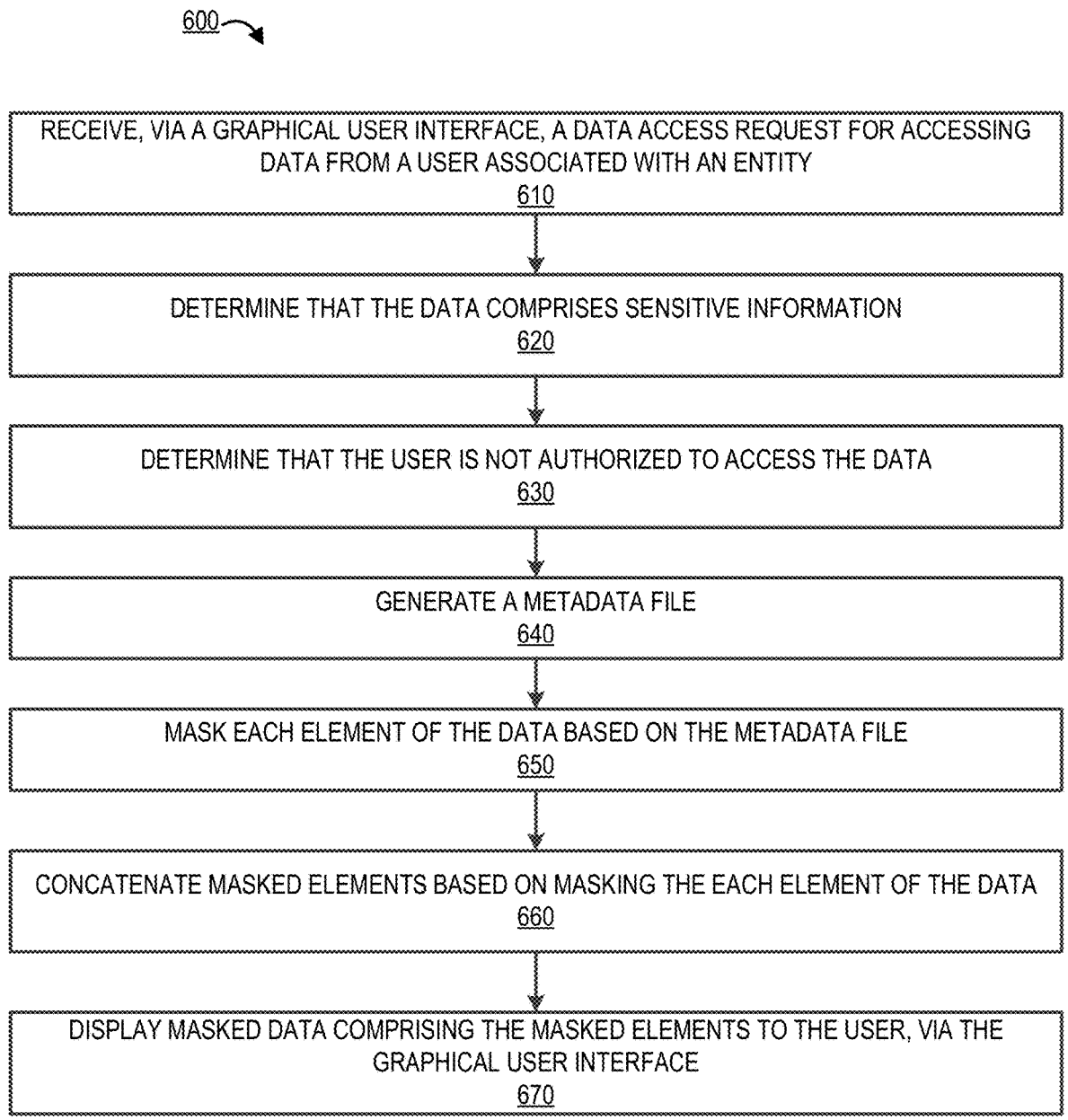

Having thus described embodiments of the invention in general terms, reference will now be made the accompanying drawings, wherein:

FIG. 1 provides a block diagram illustrating a system environment for dynamic masking of data in a network, in accordance with an embodiment of the invention;

FIG. 2 provides a block diagram illustrating the entity system 200 of FIG. 1, in accordance with an embodiment of the invention;

FIG. 3 provides a block diagram illustrating a dynamic masking system 300 of FIG. 1, in accordance with an embodiment of the invention;

FIG. 4 provides a block diagram illustrating the computing device system 400 of FIG. 1, in accordance with an embodiment of the invention;

FIG. 5 presents a block diagram illustrating the quantum optimizer of FIG. 1, in accordance with embodiments of the present invention; and FIG. 6 provides a flowchart illustrating a process flow for dynamic masking of data in a network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications. Applications as described herein may be any software applications configured to perform one or more operations of the entity. In some embodiments, the entity may be any organization that stores, manages, and/or utilizes entity data comprising sensitive data and non-sensitive data. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

Entities utilize, store, organize, and/or manage data associated with the entity, customers of the entity, or the like. Such data may comprise sensitive information associated with the entity (e.g., financial account information, or the like) and sensitive information associated with customers of the entity (e.g., Account Number, Social Security Number, or the like). Entities may also develop one or more entity applications to perform one or more organizational activities, where the one or more entity applications consume the data comprising sensitive information. While developing the one or more entity applications, one or more entity users (e.g., application developers, application testers, or the like) may need the data and/or information associated with the data to develop and test the one or more entity applications. However, such entity users may not have access to the sensitive information. In such cases, entities typically resort to scrambling of data, hashing of data, encryption of data, or the like to conceal the sensitive information. Such techniques require storing the original data along with the concealed data, thereby requiring extensive storage systems and processing power to maintain the storage systems. Also, such techniques may completely transform the data to a different format, thereby making the process of testing the one or more entity applications using such data impossible to identify any defects in the one or more entity applications. Additionally, one or more unauthorized users may perform reverse engineering of the concealed data to gain access to the sensitive information. As such, there exists a need for a system that has the capability to effectively mask data associated with the entity. The system of the present invention overcomes the above mentioned problems as explained in detail below.

FIG. 1 provides a block diagram illustrating a system environment 100 for dynamic masking of data in a network, in accordance with an embodiment of the invention. As illustrated in FIG. 1, the environment 100 includes a dynamic masking system 300, an entity system 200, a computing device system 400, and a quantum optimizer 500. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, application owners, business analysts, application testers, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that stores, manages, and/or utilizes entity data comprising sensitive data and non-sensitive data.

The dynamic masking system 300 is a system of the present invention for performing one or more process steps described herein. In some embodiments, the dynamic masking system 300 may be an independent system. In some embodiments, the dynamic masking system 300 may be a part of the entity system 200.

The dynamic masking system 300, the entity system 200, the quantum optimizer 500, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the dynamic masking system 300 is configured to communicate information or instructions with the entity system 200, the quantum optimizer 500, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the dynamic masking system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a dynamic masking application 250, one or more entity applications 270, and a data repository 280 comprising information associated with entity data 283. The one or more entity applications 270 may be any applications developed, supported, maintained, utilized, and/or controlled by the entity. Entity data 283 may comprise any data including, but not limited to, sensitive data (e.g., life duration of a user, account number, unique identification number, or the like associated with one or more customers, one or more employees, or the like associated with the entity), non-sensitive data, or the like. The computer-executable program code of the network server application 240, the dynamic masking application 250, the one or more entity application 270 to perform certain logic, data-extraction, and data-storing functions of the entity system 200 described herein, as well as communication functions of the entity system 200.

The network server application 240, the dynamic masking application 250, and the one or more entity applications 270 are configured to store data in the data repository 280 or to use the data stored in the data repository 280 when communicating through the network communication interface 210 with the dynamic masking system 300, the quantum optimizer 500, and/or the computing device system 400 to perform one or more process steps described herein. In some embodiments, the entity system 200 may receive instructions from the dynamic masking system 300 via the dynamic masking application 250 to perform certain operations. The dynamic masking application 250 may be provided by the dynamic masking system 300. The one or more entity applications 270 may be any of the applications used, created, modified, facilitated, and/or managed by the entity system 200.

FIG. 3 provides a block diagram illustrating the dynamic masking system 300 in greater detail, in accordance with embodiments of the invention. As illustrated in FIG. 3, in one embodiment of the invention, the dynamic masking system 300 includes one or more processing devices 320 operatively coupled to a network communication interface 310 and a memory device 330. In certain embodiments, the dynamic masking system 300 is operated by an entity, such as a financial institution. In some embodiments, the dynamic masking system 300 is owned or operated by the entity of the entity system 200. In some embodiments, the dynamic masking system 300 may be an independent system. In alternate embodiments, the dynamic masking system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the dynamic masking system 300 described herein. For example, in one embodiment of the dynamic masking system 300, the memory device 330 includes, but is not limited to, a network provisioning application 340, a data retrieving application 350, an access validation application 360, a random generator application 370, a masking application 380, a concatenation application 385, a quantum optimizer application 387, and a data repository 390 any other data processed or accessed by one or more applications in the memory device 330. The computer-executable program code of the network provisioning application 340, the data retrieving application 350, the access validation application 360, the random generator application 370, the masking application 380, the concatenation application 385, and the quantum optimizer application 387 may instruct the processing device 320 to perform certain logic, data-processing, and data-storing functions of the dynamic masking system 300 described herein, as well as communication functions of the dynamic masking system 300.

The network provisioning application 340, the data retrieving application 350, the access validation application 360, the random generator application 370, the masking application 380, the concatenation application 385, and the quantum optimizer application 387 are configured to invoke or use the data in the data repository 390 when communicating through the network communication interface 310 with the entity system 200, and/or the computing device system 400. In some embodiments, the network provisioning application 340, the data retrieving application 350, the access validation application 360, the random generator application 370, the masking application 380, the concatenation application 385, and the quantum optimizer application 387 may store the data extracted or received from the entity system 200, and the computing device system 400 in the data repository 390. In some embodiments, the network provisioning application 340, the data retrieving application 350, the access validation application 360, the random generator application 370, the masking application 380, the concatenation application 385, and the quantum optimizer application 387 may be a part of a single application. The functionalities of the network provisioning application 340, the data retrieving application 350, the access validation application 360, the random generator application 370, the masking application 380, the concatenation application 385, and the quantum optimizer application 387 are explained in greater detail in FIG. 6.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a dynamic masking application 421, entity application 424. These applications also typically instructions to a graphical user interface (GUI) on the display 430 that allows the user 110 to interact with the entity system 200, the dynamic masking system 300, the quantum optimizer 500, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the dynamic masking application 421 provided by the dynamic masking system 300 allows the user 110 to access the dynamic masking system 300. In some embodiments, the entity application 424 provided by the entity system 200 and the dynamic masking application 421 allow the user 110 to access the functionalities provided by the dynamic masking system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 is a schematic diagram of an exemplary Quantum Optimizer 500 that can be used in parallel with a classical computer to solve optimization problems. The Quantum Optimizer 500 is comprised of a Data Extraction Subsystem 504, a Quantum Computing Subsystem 501, and an Action Subsystem 505. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 5, the Data Extraction Subsystem 504 communicates with the dynamic masking system 300 to extract data for optimization. It will be understood that any method of communication between the Data Extraction Subsystem 504 and the network includes, but is not limited to wired communication, Radiofrequency (RF) communication, Bluetooth WiFi, and the like. The Data Extraction Subsystem 504 then formats the data for optimization in the Quantum Computing Subsystem.

As further depicted in FIG. 5, the Quantum Computing Subsystem 501 comprises a Quantum Computing Infrastructure 523, a Quantum Memory 522, and a Quantum Processor 521. The Quantum Computing Infrastructure 523 comprises physical components for housing the Quantum Processor 521 and the Quantum Memory 522. The Quantum Computer Infrastructure 523 further comprises a cryogenic refrigeration system to keep the Quantum Computing Subsystem 501 at the desired operating conditions. In general, the Quantum Processor 521 is designed to perform adiabatic quantum computation and/or quantum annealing to optimize data received from the Data Extraction Subsystem 504. The Quantum Memory 522 is comprised of a plurality of qubits used for storing data during operation of the Quantum Computing Subsystem 501. In general, qubits are any two-state quantum mechanical system. It will be understood that the Quantum Memory 522 may be comprised of any such two-state quantum mechanical system, such as the polarization of a single photon, the spin of an electron, and the like.

The Action Subsystem 502 communicates the optimized data from the Quantum Computing Subsystem 501 back to the exposure analysis system. It will be understood that any method of communication between the Data Extraction Subsystem 504 and the network includes, but is not limited to wired communication, Radiofrequency (RF) communication, Bluetooth WiFi, and the like.

In accordance with the present systems and methods, an on-board quantum optimizer may be employed to perform real-time optimizations to generate random number used in the process of dynamic masking of data as explained in detail in FIG. 6. Because a quantum computing device inherently performs optimization in its natural evolution, quantum optimizer is particularly well-suited to solve optimization problems.

FIG. 6 provides a flowchart illustrating a process flow for dynamic masking of data in a network, in accordance with an embodiment of the invention. As shown in block 610, the system receives, via a graphical user interface, a data access request for accessing data from a user associated with an entity. The user associated with the entity may be any employee, contractor, sub-contractors, or the like. The graphical user interface may be any interface provided by the system of the present invention or one or more entity applications associated with the entity. The data access request for accessing the data may be any data comprising sensitive information, non-sensitive information, or the like.

As shown in block 620, the system determines that the data comprises sensitive information. The system may determine that the data associated with the data access request may be sensitive data based on determining the type of data and information associated with the data. For example, the system may mark data as sensitive information based on inputs received from one or more users of the entity. The data associated with the data access request comprises at least one of an alphabet element (e.g., name of a customer), an numerical element (e.g., account number associated with the customer), and a special character element (e.g., account password associated with the customer). In some embodiments, the data may comprise alphanumeric elements (e.g., alphanumeric account number).

As shown in block 630, the system determines that the user is not authorized to access the data. The system may determine that the user is not authorized based on role, line of business, or the like associated with the user.

As shown in block 640, the system generates a metadata file. In response to determining that the data comprises sensitive information and/or that the user is not authorized to access the data, the system triggers the method of masking. The system generates the metadata file, where the metadata file comprises at least a random number, an alpha array, a numeric array, and a special character array. In some embodiments, the system generates the metadata file based on one or more applications present in the memory of the system. In some embodiments, the system generates the metadata file by communicating with a quantum optimizer. In such embodiments, the quantum optimizer generates randomized inputs and transmits the randomized inputs to the system. The random number may be generated may be any number used in conversion logics employed by the system to mask the data. For example, the system may generate any random number between 1 and 10. In another example, the system may generate any random number between 1 and 1000. The alpha array comprises random values assigned to each of the alphabets. In one exemplary embodiment, the system may generate an alpha array by assigning values between 0 and 25 to each of the alphabets (e.g., alpha array={A:10, B:25, C:15, . . . , Y:24, Z:19}). In some embodiments, the system may generate an alpha array for upper case alphabets and lower case alphabets separately. The numeric array comprises random values assigned to each of the numbers between 0 and 9. For example, numeric array={0:5, 1:4, 2:3, 3:2, 4:6, 6:1, 7:0, 8:9, 9:8}. The special character array comprises random values assigned to each of the special characters.

As shown in block 650, the system masks each element of the data based on the metadata file. In an embodiment, where the data comprises an alphabet element, a numeric element, and a special character element, the system performs alphabet masking of the alphabet element, numeric masking of the numerical element, and special character masking of the special character element. Alphabet masking of the alphabet element may be performed based on the alpha array in the metadata file. Numeric masking of the alphabet element may be performed based on the numeric array in the metadata file. Special character masking of the alphabet element may be performed based on the special character array in the metadata file. The system may employ different conversion logics for each of the alphabet masking, numeric masking, and special character masking. The conversion logics may be complex in nature. In some embodiments, the system may generate random conversion logics. In some embodiments, the conversion logics may be static, where the logics are provided by one or more users of the entity. In one embodiment, the system may perform alphabet masking based on a first logic (e.g., $(x^n+n)$ %26, where n is the random number in the metadata file and x is the value assigned in the alpha array to the alphabet being masked). For example, if the alpha array generated by the system is {A:10, B:25, C:15, . . . P:23 . . . , Y:24, Z:19} and the data comprising a partial account number is 'ABC,' the system performs alphabet masking to convert 'A' to 'Y' based on the first logic $((10^2+2))\%26=24$, where '2' is the random number generated), 'B' to 'P' based on the first logic $((25^2+2)$ %26=23, where '2' is the random number generated), and 'C' to 'Z' based on the first logic $((15^2+2)\%26=19$, where '2' is the random number generated). It should be understood that the first logic shown herein is for illustrative purposes only and does not delineate the scope of the invention in any way. In one embodiment, the system may perform numeric masking based on a second logic (e.g., $((x^n)+n)$ %10, where n is the random number in the metadata file and x is the value assigned in the numeric array to the numeric element being masked). For example, if the numeric array generated by the system is {0:5, 1:4, 2:3, 3:2, 4:6, 6:1, 7:0, 8:9, 9:8} and the data comprising a partial account number is '1234,' the system performs numeric masking to convert '1' to '9' based on the second logic $((4^2+2)\%10=8$, where '2' is the random number generated), '2' to '4' based on the second logic $((3^2+2)\%10=1$, where '2' is the random number generated), '3' to '1' based on the second logic $((2^2+2)\%10=6$, where '2' is the random number generated), and '4' to '9' based on the second logic $((6^2+2)\%10=8$, where '2' is the random number generated). Masking of the numeric elements '1' and '4' results in the output '9,' which reduces the chances of reverse engineering to zero and improving the effectiveness of masking.

As shown in block 660, the system concatenates masked elements based on masking the each element of the data. Combining both the examples, if the account number of a customer is 'ABC1234,' the system performs masking dynamically in real-time to output 'YPZ' for alphabet elements and '9419' for numeric elements. The system concatenates the outputs of alphabet masking and numeric masking to generate an output 'YPZ9419.'

As shown in block 670, the system displays masked data comprising the masked elements to the user, via the graphical user interface. In some embodiments, the system may generate a unique metadata file for every data access request, every role associated with users initiating data access request, for every line of business, or the like, thereby improving the effectiveness of masking. For example, the system may use the same metadata file to mask data associated with two different data access requests initiated by two application developers who are developing the same entity application.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamic masking of data in a network, the system comprising:
   at least one network communication interface;
   at least one non-transitory storage device; and
   at least one processing device coupled to the at least one non-transitory storage device and the at least one network communication interface, wherein the at least one processing device is configured to:
   receive, via a graphical user interface, a data access request for accessing data from a user associated with an entity;
   determine that the data comprises sensitive information;
   determine that the user is not authorized to access the data;
   dynamically perform non-scramble masking of the data based on determining that the data comprises the sensitive information and that the user is not authorized to access the data, wherein performing the non-scramble masking of the data comprises:
      generating a metadata file;
      masking each element of the data based on the metadata file, wherein the metadata file comprises at least a random number, an alpha array, a numeric array, and a special character array;
      concatenating masked elements to generate the masked data based on masking the each element of the data; and
   display masked data to the user, via the graphical user interface.

2. The system of claim 1, wherein the data comprises at least one of an alphabet element, an numerical element, and a special character element.

3. The system of claim 2, wherein the at least one processing device is configured to:
perform alphabet masking of the alphabet element in the data based on the alpha array;
perform numeric masking of the numerical element in the data based on the numeric array; and
perform special character masking of the special character element in the data based on the special character array.

4. The system of claim 3, wherein the alphabet masking is performed based on a first conversion logic, the numeric masking is performed based on a second conversion logic, and the special character masking is performed based on a third conversion logic.

5. The system of claim 1, wherein the at least one processing device is configured to generate the metadata file based on a randomized input generated by a quantum optimizer.

6. A computer program product for dynamic masking of data in a network, the computer program product comprising a non-transitory computer-readable storage medium having computer executable instructions for causing a computer processor to perform the steps of:
receiving, via a graphical user interface, a data access request for accessing data from a user associated with an entity;
determining that the data comprises sensitive information;
determining that the user is not authorized to access the data;
dynamically performing non-scramble masking of the data based on determining that the data comprises the sensitive information and that the user is not authorized to access the data, wherein performing the non-scramble masking of the data comprises:
generating a metadata file;
masking each element of the data based on the metadata file, wherein the metadata file comprises at least a random number, an alpha array, a numeric array, and a special character array;
concatenating masked elements to generate the masked data based on masking the each element of the data; and
displaying masked data to the user, via the graphical user interface.

7. The computer program product of claim 6, wherein the data comprises at least one of an alphabet element, an numerical element, and a special character element.

8. The computer program product of claim 7, wherein the computer executable instructions cause the computer processor to perform the steps of:
performing alphabet masking of the alphabet element in the data based on the alpha array;
performing numeric masking of the numerical element in the data based on the numeric array; and
performing special character masking of the special character element in the data based on the special character array.

9. The computer program product of claim 8, wherein the alphabet masking is performed based on a first conversion logic, the numeric masking is performed based on a second conversion logic, and the special character masking is performed based on a third conversion logic.

10. The computer program product of claim 6, wherein the computer executable instructions cause the computer processor to perform the step of generating the metadata file based on a randomized input generated by a quantum optimizer.

11. A computer implemented method for dynamic masking of data in a network, wherein the method comprises:
receiving, via a graphical user interface, a data access request for accessing data from a user associated with an entity;
determining that the data comprises sensitive information;
determining that the user is not authorized to access the data;
dynamically performing non-scramble masking of the data based on determining that the data comprises the sensitive information and that the user is not authorized to access the data wherein performing the non-scramble masking of the data comprises:
generating a metadata file;
masking each element of the data based on the metadata file, wherein the metadata file comprises at least a random number, an alpha array, a numeric array, and a special character array;
concatenating masked elements to generate the masked data based on masking the each element of the data; and
displaying masked data to the user, via the graphical user interface.

12. The computer implemented method of claim 11, wherein the data comprises at least one of an alphabet element, an numerical element, and a special character element.

13. The computer implemented method of claim 12, wherein the method further comprises:
performing alphabet masking of the alphabet element in the data based on the alpha array;
performing numeric masking of the numerical element in the data based on the numeric array; and
performing special character masking of the special character element in the data based on the special character array.

14. The computer implemented method of claim 13, wherein the alphabet masking is performed based on a first conversion logic, the numeric masking is performed based on a second conversion logic, and the special character masking is performed based on a third conversion logic.

* * * * *